May 31, 1966  F. J. P. MAILLARD  3,253,471
APPARATUS FOR INDICATING ANGULAR VELOCITIES
OR/AND ACCELERATIONS

Filed Dec. 6, 1962  3 Sheets-Sheet 1

INVENTOR.
FERDINAND J. P. MAILLARD
BY
Karl F. Ross
ATTORNEY

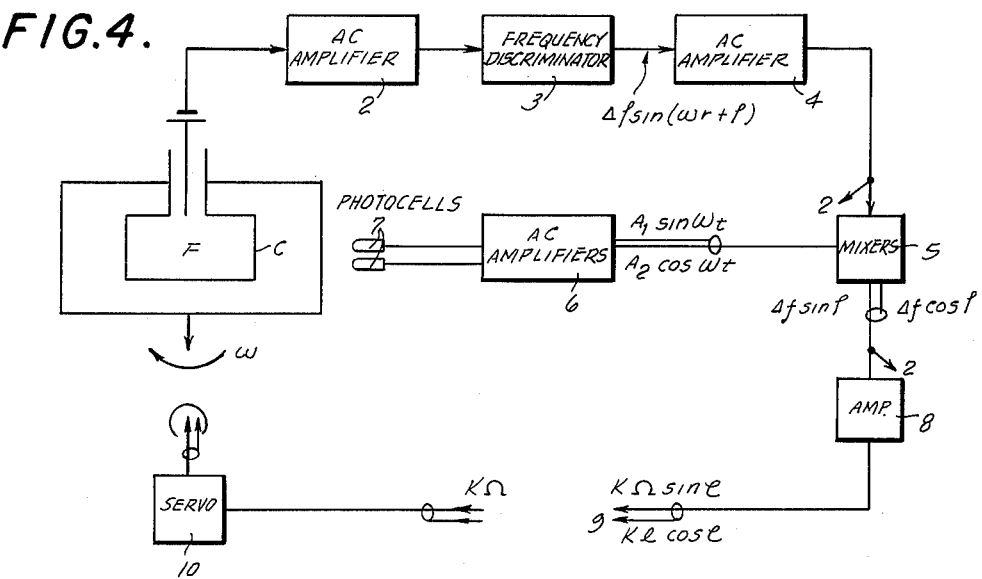
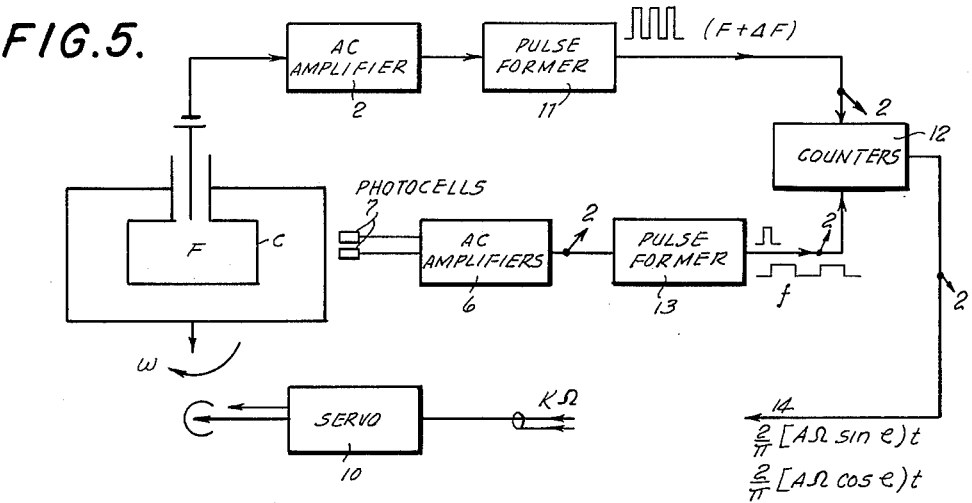

May 31, 1966     F. J. P. MAILLARD     3,253,471
APPARATUS FOR INDICATING ANGULAR VELOCITIES
OR/AND ACCELERATIONS
Filed Dec. 6, 1962     3 Sheets-Sheet 3

INVENTOR.
FERDINAND J.P. MAILLARD
BY
Karl G. Ross
ATTORNEY

United States Patent Office 3,253,471
Patented May 31, 1966

3,253,471
APPARATUS FOR INDICATING ANGULAR
VELOCITIES OR/AND ACCELERATIONS
Ferdinand Jean Pierre Maillard, Saint Germain-en-Laye,
France, assignor to Compagnie Francaise Thomson-Houston, a corporation of France
Filed Dec. 6, 1962, Ser. No. 242,678
Claims priority, application France, Dec. 12, 1961,
881,655, Patent 1,315,839
17 Claims. (Cl. 73—505)

This invention relates to apparatus capable of providing improved indications of angular velocities, or/and accelerations, as desired, of motions to which the structure on which such apparatus is mounted is subjected. While the invention is of especial value as a navigational appliance, e.g. part of an inertial guidance system for aircraft and the like, and while special reference will accordingly be made to this particular application, it is to be understood that the invention may well find desirable uses in other fields.

In present automatic craft guidance systems it is required to measure with high degrees of accuracy both the angular velocities of rotation and the linear accelerations to which the craft is subjected at any time during flight about and along its control axes. Conventional methods of angular-velocity measurement involving rate gyros and other gyroscopic devices, wherein the precession rate of a gyro frame subjected to torque about an axis normal to the gyro spin axis is measured, are subject to serious limitations on the accuracy attainable, on account of the fact that the precession-rate measurements are clouded by the effects of spurious forces, especially those due to bearing friction and external accelerations. To overcome these influences and approach the high values of sensitivity and accuracy required in many present-day applications, complicated expedients have to be resorted to. Thus, bearing friction can be reduced by suspending the gyro in a pressure fluid, or further in an electromagnetic field, the latter method requiring the use of superconductivity effects. In order to eliminate the influence of external accelerations it has been proposed also to suspend the rotor in a fluid of the same effective density as the rotor, with the center of gravity coinciding with the center of buoyancy. All these expedients are highly complicated and raise serious engineering problems which have not been fully overcome. The resulting instruments are bulky and fragile, are expensive to construct and maintain, and tend to be unreliable. Generally similar difficulties are encountered in the field of accelerometry when it is desired to measure accurately linear accelerations as low as $10^{-5}g$, for example.

It is an object of this invention to provide improved means for measuring angular velocities or/and accelerations with degrees of precision at least equivalent to what is attainable by the more elaborate conventional methods, while being at the same time very simple mechanically. As will be made clear, this object is attained primarily by the use of oscillatory, or alternating, effects created by the angular velocity, or acceleration as the case may be, that is to be measured. Through the use of oscillatory effects rather than the unidirectional effects that were heretofore generally used, it becomes a very simple matter to eliminate the influence of the spurious force components, such as bearing friction and external accelerations, mentioned above since such spurious forces are essentially unidirectional. Thus, an instrument according to the invention operated as a rate meter can be designed and constructed without any special precautions so as to attain a degree of sensitivity equivalent to the theoretical sensitivity of a gyroscope which is practically unattainable at present without excessive complications.

Other objects are to provide rate meters and accelerometers which are capable of directly providing output signals in the form of alternating electric signals corresponding in amplitude to the magnitude of the factor—rate or acceleration—to be measured, which signals may then be easily processed by suitable electrical techniques.

The various objects, aspects and features of the invention will now be described with reference to specific embodiments selected by way of illustration but not of limitation and with reference to the accompanying drawing, wherein:

FIG. 4 is a block diagram illustrating the electrical frequency-measuring system associated with a rate meter according to one embodiment of the invention;

FIG. 5 is a similar diagram relating to a modified embodiment;

Figure 1:
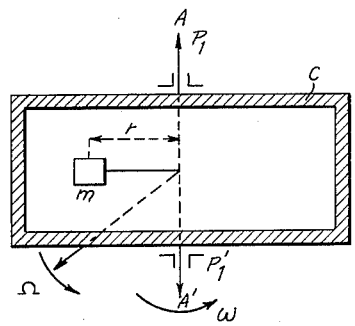
FIG. 1 is a schematic view showing in axial cross-section a simplified rate meter arrangement illustrating the basic principle of the invention.

The basic concept underlying the invention may be explained as follows: When a spinning mass eccentric with respect to the spin axis is subjected to angular motion about an axis inclined with reference to the spin axis, or is subjected to acceleration, then, provided the mass is mounted with a limited degree of freedom in a chosen direction with respect to the spinning structure on which it is supported, the mass will in either case be subjected to an oscillatory movement with respect to the support structure as permitted by its said limited degree of freedom. Specifically, in the case the mass is mounted with a limited degree of freedom in a direction parallel to the spin axis, then any angular displacement of the structure about an axis normal to the spin axis will combine with the spin to generate a so-called Coriolis force component which is inherently of such character that the mass will oscillate along its direction of freedom at a frequency determined by the spin velocity of the mass and an amplitude proportional to the rate of said angular displacement. In case the mass is mounted with a limited degree of freedom say in the radial direction with respect to the spin axis, and is resiliently restrained as by a spring in such direction, then any linear acceleration of the structure in a direction normal to the spin axis will combine with centrifugal force due to the spin, and with the restraining spring force, to cause the mass to oscillate along its (here radial) direction of freedom at a frequency determined by the spin velocity of the mass and an amplitude proportional to the acceleration.

In either case, the oscillatory movement of the mass is, according to the invention, converted into an oscillatory electric signal of corresponding frequency through suitable pick-up means, conveniently capacitive in character. The amplitude of this signal is then determined as a measure of the characteristic of motion—angular rate or acceleration—that is to be indicated.

Desirably, for this purpose, the oscillatory electric signal is used to frequency-modulate the constant-frequency output from an oscillator, advantageously supported from the spinning structure. The modulated signal may then be passed through a discriminator to derive the modulating component, and this latter may be mixed with a phase reference signal at a frequency corresponding to the velocity of the spinning structure to produce a final signal proportional to the frequency-excursion or modulation amplitude of the original modulated signal and hence proportional to the parameter (i.e. angular rate or acceleration) to be indicated. Alternatively, an equivalent result may be achieved by pulse techniques. The invention will now be described in greater detail with reference to the drawing.

In FIG. 1 a rate-meter system according to the invention is schematically illustrated as comprising a cylindrical casing C suitably mounted for high-speed rotation about an axis AA' at an angular velocity $\omega$. Mounted within the casing for rotation therewith is a mass $m$ positioned off-center from the spin axis AA' at a distance $r$ therefrom. It will be recognized that the system thus described constitutes a gyroscopic system and that if a torque is applied to the casing C about an axis non-coincident with the rotational axis AA' the system will precess about an axis normal to AA' at a certain angular velocity $\Omega$, generally having a low value relative to the spin velocity $\omega$.

In accordance with the invention, the precessional velocity $\Omega$ is determined from a consideration of the complementary acceleration component, otherwise known as the Coriolis force component, to which the mass $m$ is subjected by the combination of the angular velocities $\omega$ and $\Omega$ imparted to it. More specifically, it is known that the Coriolis force can be expressed as $$\gamma_c = 2\Omega v \cos \omega t \qquad (1)$$

wherein $v = r\omega$, i.e. the linear velocity of the center of gravity of mass $m$, and $t$ is time, measured from an initial instant at which the linear-velocity vector $v$ is normal to the angular-rotation vector $\Omega$ to be measured. From Equation 1 it is evident that the Coriolis force $\gamma_c$ is a quantity varying sinusoidally with time, and that its mathematical expression closely resembles that of an alternating electric signal. In accordance with an important aspect of the invention, this formal resemblance is taken advantage of by converting the value of the Coriolis force applied to the revolving mass $m$ into an electric voltage signal of corresponding frequency, and indicating the amplitude of that signal as a measure of the desired precessional angular velocity $\Omega$. Means through which such conversion may be effected will be described later.

It wil be understood that in order for the method just described to provide an accurate measurement of the angular rate $\Omega$, it is important to ensure that the system is insensitive to extraneous acceleration forces that might obscure the measurement. It is noted in this connection that, provided the spin axis AA' is rigidly connected with the rotary system, such extraneous accelerations will generally result in the presence of a direct-voltage signal which (as earlier mentioned) can be easily separated from the useful alternating signal. Nevertheless, in accordance with a preferred embodiment of the invention, the influence of extraneous acceleration forces to which the system as a whole may be subjected is further eliminated in the manner now to be described with reference to FIG. 2.

As shown in that figure, there are provided within casing C two eccentric masses $M_1$ and $M_2$ symmetrically arranged on the opposite sides of spin axis AA' and rigidly interconnected by a link rod which is swingable in the casing C about a pivot normal to axis AA' at the center of Gravity O of the two-mass system $M_1$–$M_2$. It will be apparent that in such a system any unidirectional acceleration applied to the system as a whole will exert equal and opposite effects on the two masses and its over-all effect on the system will be zero. However, the Coriolis force component arising out of the additional rotation $\Omega$ imparted to the system about an axis normal to the spin axis of both masses will not cancel as between the two masses, but will instead impart to the two-system mass an oscillatory swinging movement about the pivot O at the frequency $\omega$. Such oscillation can then be converted into an alternating electric signal as mentioned earlier and as will be described in greater detail hereinafter.

In order to take full advantage of the sensitivity of the method used in a system according to the invention, any conventional means may be used for eliminating such causes of error as the noise signal generated at the bearings supporting the system for rotation about the spin axis AA'. Such noise signals will lie within a frequency band centered at the frequency $\omega$, the width of this band being determined interalia by the desired response speed of the system. A desirable way of eliminating such noise signals may include the conventional expedient of bodily immersing the cylindrical casing C of FIG. 1 or FIG. 2 in a liquid having a mean density equaling that of the hollow casing, so that accelerations will not result in the creation of increased reaction forces at the bearings; further, the journals for the spin axis AA' may include intermediate bearings as schematically shown at P1, P'1 in FIGS. 1 and 2 to which rotation is imparted in a direction opposite the spin about axis AA', the angular rate $\omega'$ of bearing rotation being different from the angular spin rate $\omega$ and the ratio between the two rates being other than an integral number.

Figure 2:
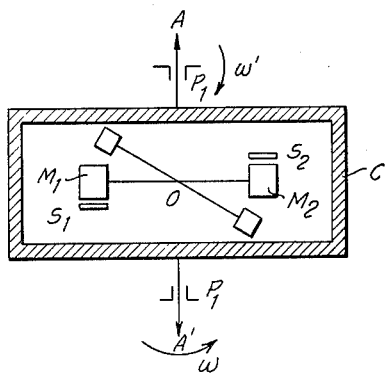
FIG. 2 is a similar view of a preferred rate meter arrangement.
Figure 3:
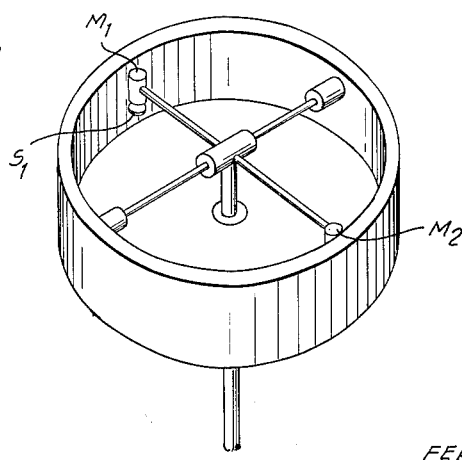
FIG. 3 is a simplified perspective view of a rate meter according to the invention conforming to the basic arrangement of FIG. 2.

The pulsating Coriolis force component, to which the mass $m$ or masses M1, M2 is or are subjected in the rate-meter system of the invention may be converted into an electric alternating-voltage signal in a variety of ways; yet, according to a preferred aspect of the invention, this result is achieved by transducing the effect of said Coriolis component on the masses M1 and M2 into a high frequency electric signal which is used to frequency modulate an oscillation generator associated with the spinning system. Such an oscillator is then operated at a relatively high basic frequency-F and the frequency modulated signal has an amplitude which is proportional to the Coriolis force of the spinning mass or masses, the modulating frequency $f$ being that of the spinning system itself. One convenient form of frequency-modulated signal generator consists of a high frequency oscillator associated with the spinning system, said oscillator comprising a tank circuit whose capacitance or inductance is varied in accordance with the pressure exerted by the masses M1 and M2 or with their displacement. As schematically indicated in FIGS. 2 and 3, there are provided for the above-intended purpose a pair of condenser electrodes or plates S1 and S2 which may be fixedly mounted within the casing C at positions that are adjacent to a lower and an upper surface of each of the masses M1 and M2 respectively and lie symmetrically about the center O. As the two-mass system oscillates about its fulcrum O in response to the pulsating Coriolis force as earlier described, the capacitance of the two condensers respectively constituted by elements M1–S1 and M2–S2 will be correspondingly varied in similar senses. If the said condensers are connected, say, in a tank circuit of the oscillator, the oscillator output frequency will be correspondingly varied or modulated in accordance with the variations in Coriolis force. Specifically, from Equation 1 above, the output frequency of the oscillator will be modulated about the mean value F to an extent proportional to $\gamma_c$, hence proportional to the angular velocity $\Omega$ to be measured, at a frequency $\omega$, as given by the formula $$\Delta f = A\Omega \sin(\omega t + \theta) \qquad (2)$$

where the phase angle $\theta$ will depend on the orientation of the angular velocity vector $\Omega$.

Any of various means may be used to determine the orientation of the velocity vector $\Omega$ being measured, i.e. the phase angle $\theta$ in the above Equation 2. A convenient way is to use an electro-optical system which may include two or more photocells mounted at fixed stations spaced around the outer peripheral surface of the cylindrical casing C, this casing surface being provided with two or more light-reflecting sectors separated by nonreflective sectors. When the outer peripheral surface of casing C is illuminated from a light source, the electrical outputs from the respective photocells will vary sinusoidally as phase-displaced alternating voltages. These will be of the form $A_1 \sin \omega t$ and $A_2 \cos \omega t$ if two photocells displaced 90° from one another are used, and of the form $A_1 \sin \omega t$, $A_2 \sin (\omega t + 2\pi/3)$, $A_3 \sin (\omega t + 4\pi/3)$ in the case of three cells spaced 120° apart. The resulting photocell voltages can then be mixed with the modulated frequency from the oscillator to provide the desired indications relating to the magnitude and spatial orientation of the angular-velocity vector $\Omega$ being measured. The above will be better understood by reference to FIG. 4 which shows a circuit diagram of an electrical system embodying this aspect of the invention.

In FIG. 4, there is schematically illustrated a cylindrical casing C rotated at angular velocity $\omega = 2\pi f$, and containing within it, in addition to the two-mass system shown in FIGS. 2 and 3, a miniature oscillation generator (not shown) keyed to a fundamental frequency F, of a suitably high value. It will be understood that the oscillation generator may be of any suitable type, preferably transistorized, and that its circuit may include the capacitances M1–S1 and M2–S2, suitably connected therein, so that the similar variations in each of said capacitors due to the Coriolis forces acting on the masses will cause corresponding variations in the oscillator output frequency. Since an oscillator circuit fulfilling these specifications will be easily constructed in the present state of the art, no showing thereof is believed necessary.

The oscillator output frequency F is taken out of the revolving structure, e.g. through an axially extending conductor as shown, and is applied to an amplifier 2 and thence to a frequency discriminator 3 which is of a conventional type adapted to produce an output corresponding to the frequency excursion resulting from the modulation of the oscillator frequency in accordance with Coriolis force as earlier explained. The discriminator output, of the form $\Delta f \sin (\omega t + \theta)$, is passed through a further amplifier 4 where the low frequency component $f$ thereof is amplified. The amplified output is applied to one input of a frequency converter or mixer 5 which receives at another input the output of an amplifier 6. That amplifier receives the 90° phase-displaced outputs from a pair of photocells 7 arranged at positions 90° apart around the revolving casing C as earlier described. Amplifier 6, operating at the frequency $f$, delivers the two outputs $A_1 \sin \omega t$ and $A_2 \cos \omega t$. The mixer 5 effects a multiplication of the frequency signals applied to its inputs so as to provide output signals of the form $\Delta f \sin \theta$ and $\Delta f \cos \theta$, which are simultaneously amplified in a D.-C. amplifier 8. The output 9 from the D.-C. amplifier therefore provides a D.-C. voltage signal proportional in magnitude to the angular velocity $\Omega$ to be measured, whose vector is normal to the spin axes of the system rotated at velocity $\omega$, this signal being of positive or negative polarity depending on the sense of the vector $\Omega$. The $f$-frequency A.-C. amplifiers 4 and 6 should introduce equal phase displacements into the signals amplified thereby. The resulting D.-C. output at 9 is shown in the diagram as being applied to an appropriate servo-motor 10 which may govern the attitude of the revolving system in any conventional manner so as to stabilize the system with respect to the vertical direction, or produce any other desired control effect depending on the application.

FIG. 5 illustrates a modification of the system just described, wherein components similar to components in FIG. 4 are designated by the same reference numbers. The modified system functions on a digital basis, that is, the amplified modulated oscillator output derived from amplifier 2 is passed through a conventional limiter circuit 11 which delivers constant-amplitude pulses at a pulse rate corresponding to the frequency F. These pulses are supplied to one input of a pulse counter 12. The output signals from a pair of photocells 7, similar to those used in the embodiment of FIG. 4, are amplified in amplifier 6, responsive to the frequency component $f$ thereof, and are then passed to a limiter or pulser 13 to provide square pulses at the rate $f$. The conventional pulse counter 12 operates to total the signals received by it during periods determined by the pulses of rate $f$. In other words, the counter 12 acts to count the cycles of carrier frequency F of the oscillator during successive, intermittent periods of time determined by the spin frequency $f$. Over one half-cycle of the $f$ frequency, i.e. during a time $\pi/\omega$, the counter will count a number of cycles $(F + \Delta f)$ and during the next half-cycle it will count a number of cycles $(F - \Delta f)$. So long as the output frequency F remains constant, the total count and hence the output of the counter will be zero, whereas if F is modulated at frequency $f$, the counter will produce an output corresponding to $2\Delta f$, i.e. a magnitude proportional to the product $\Omega t$. This output signal, proportional to the angular velocity $\Omega$ to be measured, may, as in the embodiment of FIG. 4, be applied to a suitable servo-motor 10 as for regulating the attitude of the revolving system or for any other desired purpose.

As so far described, the invention was embodied in systems for measuring an angular velocity. However, the basic principle of the invention is usable also in the measurement of accelerations and this aspect of the invention will now be described.

Figure 6:
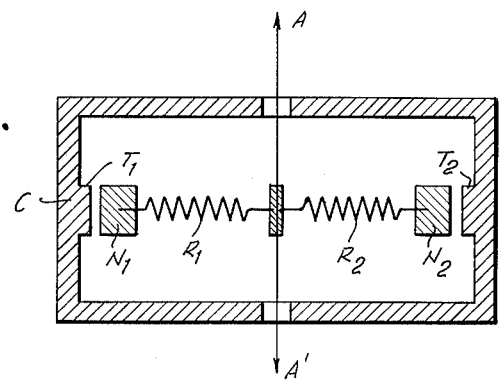
FIG. 6 is a schematic view in axial section of an accelerometer arrangement according to the invention.

In FIG. 6, there is diagrammatically shown a basic accelerometric arrangement comprising a pair of masses N1 and N2 disposed within a spinning cylindrical casing C symmetrically on opposite sides of the spin axis, the two masses being connected to the spin axis by tension springs R1 and R2. With a constant spin velocity, the two masses will assume positions of equilibrium within the casing under the opposite influences of centrifugal force and spring tension. If such a system is exposed to a linear acceleration in a plane normal to the spin axis of the casing, the masses will be subjected to radial oscillatory motions towards and away from the axis, the frequency of such motions corresponding to the spin velocity $\omega$, while the amplitudes will be proportional to the applied acceleration. According to this invention, those oscillatory motions may be converted into alternating electric voltage signals, preferably by frequency-modulation of a pair of oscillators embodied in the spinning system, in a manner that may be generally similar to that used in connection with the angular-rate measurement as previously described. Specifically, condenser plates T1 and T2 may be provided at diametrically opposite positions of the inner wall of the cylindrical casing adjacent to the respective radially outer surfaces of the masses N1 and N2 as shown in FIG. 6. The capacitances thus provided may be connected in the output circuits of a pair of oscillators mounted for rotation with the casing C, and the modulated output frequencies of the oscillators may be applied to output circuits of either of the types shown in FIGS. 4 or 5 to provide otuput D.-C. signals which will be proportional in magnitude to the modulating amplitudes and hence to the applied acceleration. For a given value of transverse acceleration, the oscillatory frequencies $f1$ and $f2$ of the respective masses will be varied by respective amounts $\Delta f1$ and $\Delta f2$ of opposite sign. The resulting modulating amplitudes for the output frequency F of the oscillators, measured as described above, may be algebraically added to provide a resultant value indicative of the acceleration. It will be noted at the same time that in the event of an accidental variation in the spin velocity of the system, as is usually unavoidable in practice, the two masses will both be displaced by a small amount radially outwardly (if the spin velocity has increased) or inwardly (if spin velocity has decreased), thereby introducing variations of identical algebraic sign into the frequency-modulation terms. Hence the effects of any such variations in spin velocity will be automatically canceled out during the above-mentioned algebraic adding step so that they will not introduce any error into the acceleration measurement.

It is to be understood that, in the accelerometer system of the invention just described, it is preferred to use the two symmetrical masses as shown in FIG. 6 since this provides better dynamic balancing as well as cancellation of errors due to fluctuations in the spin velocity of the system. However, it will be evident that basically similar results could be obtained by using a single spinning accelerometer mass, such as the mass N1 with its associated tension spring R1. It is to be understood also that, according to the invention, the system effects to the measurement of accelerations normal to the spin axis, and hence, wherever necessary, there may be provided several such systems having differently oriented spin axes normal to the respective planes in which accelerations are liable to occur. Such an arrangement will enable high-accuracy measurement of accelerations over extremely wide ranges. This is an important advantage e.g. in flight systems, such as inertial guidance systems, since for navigational purposes an accelerometer forming part of such a system may have to respond to values of acceleration as low as $10^{-5}g$, while it will have to be capable of withstanding without damage acceleration forces as great as $10g$ or more as imposed thereon by craft flight maneuvers. In the case of accelerations applied normally to the spin axis, i.e. with a radial direction of freedom for the masses N1, N2, these conditions are easily met, as can be shown by the following exemplary calculation. Assume a spin velocity of 3000 r.p.m. for the system, i.e. $\omega = 100\pi$. For a radial distance of the center of gravity of each mass from the spin axis of $r=3$ cm., the value of centrifugal acceleration will be $\gamma = \omega^2 r = 3 \times 10^4 \pi^2$ or approximately $\gamma = 3.10^5$ cm./sec.$^2$ or $300g$. Assume the mass is displaced a distance of say, $x_0 = 0.3$ cm. by value of this value of centrifugal acceleration, then it will be displaced a thirtieth of this distance, i.e. 0.01 cm. under the assumed maximum craft acceleration of $10g$. If the mass is positioned at a distance of 0.1 cm. from the peripheral capacitor plates T1 at zero craft acceleration, then the $10g$ assumed maximum craft acceleration is seen to introduce no interference with the normal operation of the accelerator system. It may further be noted that with the above numerical values assumed for spin velocity $\omega$ and maximum displacement $x_0$ under centrifugal force, the natural frequency of the mass-spring system would be $f_0 = 160$ c.p.s. Further, the lowermost acceleration values of the range of measurement, assumed above as $10^{-5}g$, would result in mass displacements of the order of $10^{-8}$ cm. Displacements of this order of magnitude are readily detectable by present electrical techniques such as the capacitance-variation, frequency-modulation methods described above. It should be understood that the numerical values indicated in the above analysis are selected for illustrative purposes only and that other values, differing widely from those assumed above, may be used in an operative system according to the invention.

Figure 7:
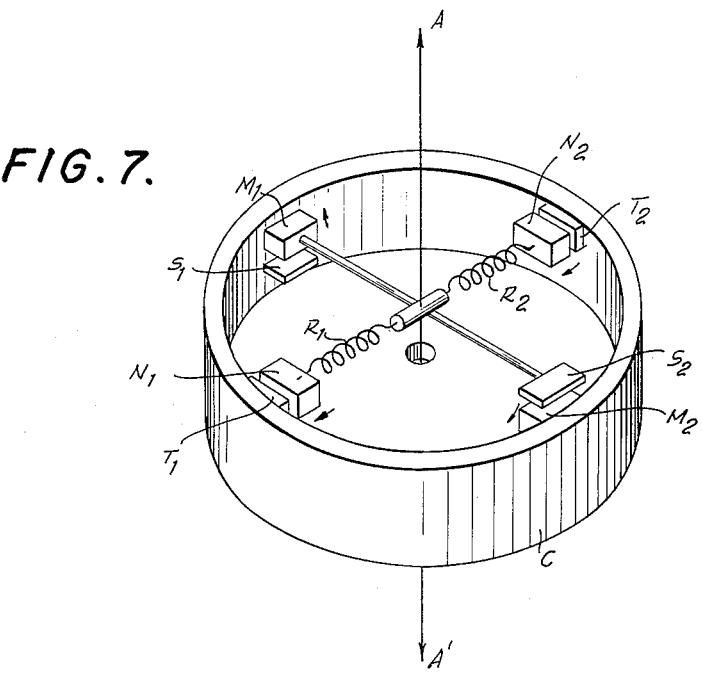
FIG. 7 is a perspective view of a composite navigational instrument according to the invention serving both as a rate meter and as an accelerometer.

In accordance with a further aspect of the invention, combining the teachings relating to angular-rate measurement and acceleration measurement as described above, there is provided a composite system for simultaneously measuring angular rates and accelerations. Such a combined rate-meter-accelerometer instrument, as illustrated in FIG. 7, may comprise a common cylindrical casing C driven in high-speed rotation about its axis. Mounted within the casing for spinning bodily with it is a four-mass assembly including the pair of diametrically opposite rate-meter masses M1 and M2 and the pair of diametrically-opposite accelerometer masses N1 and N2, the two pairs of masses preferably being displaced 90° from one another as shown. The rate-meter masses M1 and M2 are rigidly interconnected by an arm $a$ which extends through the spin axis of the casing and in fulcrumed therein on a horizontal pivotal axis so as to be capable of swinging in response to the Coriolis force component on occurrence of an angular rotation of the system about an axis normal to the spin axis. The accelerometer masses N1 and N2 are connected to the spin axis by way of springs R1 and R2 acting on a diametric line extending through the spin axis, and are restrained through suitable guide means from swinging out of their plane normal to the spin axis, so as to respond essentially to transverse accelerations occuring in said normal plane as earlier described. Capacitive pick-off means, similar to those shown in the preceding embodiments, are again illustrated in FIG. 7 for sensing the displacement of the pairs of masses in response to angular rate and acceleration respectively. As shown, the pick-off means associated with the rate-meter masses M1 and M2 comprise a pair of condenser plates including a plate S1, positioned below and adjacent the lowermost face of mass M1, and another condenser plate S2 positioned above and adjacent the upper face of mass M2, so as to constitute with said faces a pair of condensers whose capacitance is varied in the same sense upon swinging of the pair of masses M1, M2 in response to a Coriolis force due to the angular rate to be measured. The pick-off means associated with the accelerometer masses N1 and N2 comprise a pair of condenser plates T1 and T2, positioned outwardly of and adjacent the outer faces of masses N1 and N2, respectively, so as to constitute with said faces a pair of condensers whose capacitance is varied in opposite senses on displacement of the pair of masses N1, N2 in response to a transverse acceleration to be measured. The system may further comprise three miniaturized oscillator circuits (not shown) disposed within the casing C. One oscillator is associated with the rate-meter masses M1, M2 and its circuit includes the capacitance of the two condensers provided by said masses together with the associated plates S1, S2. The other two oscillators are associated with the accelerometer masses N1, N2 and their circuits include the respective capacitances of the two condensers provided by said masses with the respectively associated plates T1, T2. It will be understood that the output circuits associated with the respective oscillators may be generally similar to those earlier described, but simplifications are possible, as by providing certain components in common for the three systems. Thus, a single photoelectric cell system may be provided for detecting the reference phase angle for all three oscillator systems.

A composite rate-meter/accelerometer system of the type just described will find many useful applications in inertial guidance and other navigational aids for aircraft and the like. When used as a gyro-compass, for example, the instrument will simultaneously provide the high kinetic moment and gyroscopic rigidity for platform satbilization, the accelerometric response required for horizontal orientation of the platform in a prescribed direction, and the rate-meter response for measuring angular rotations about a prescribed horizontal axis.

It will be understood that the invention is susceptible of a wide variety of embodiments and applications other than those specifically described or mentioned above. Thus, the pick-off means serving to convert the oscillatory movements of the mass or masses into corresponding oscillatory electrical signals may assume forms other than that of the capacitive pick-offs described. Electromagnetic or inductive pick-off means may be used, with the position of the mass, made of suitable magnetic material, acting to modify the magnetic field of electromagnetic winding means. Or the pick-off means may be resistive in character, with the position of the mass serving to deform a suitable strain-responsive resistance. Another possibility is a piezo-electric pick-off device, wherein the displacements of the mass or each mass would serve to distort a piezoelectric crystal and correspondingly vary an output signal.

Depending on the particular application, the high-speed spinning system used according to the invention may form part of some existent structure, driven in rotation at a suitable rate for some purpose other than that of the invention, or it may be specially constructed for the purpose of the invention. It may be noted that the accelerometer described has inter alia the advantage of making possible a regulation of the spinning velocity by a frequency-discriminating step. The carrier frequency signal has a frequency depending directly on the spin velocity. While a single frequency may be used in the accelerometer, it is preferred to use two different frequencies, and this will generally simplify the mechanical structure involved.

To mention a few other possible modifications, it may be noted that the rate-meter masses such as M1, M2 (FIG. 2 or 7) are not necessarily pivotally mounted as was described above. Instead, they may be mounted and guided for limited sliding displacement in the casing C generally parallel to the spin axis since such an arrangement will provide the requisite freedom of movement for the masses in response to Coriolis force just as well as the pivotal arrangement shown. In regard to the accelerometer aspect of the invention, it has been mentioned that only accelerations transverse to the spin axis of the system were measured. The composite instrument as illustrated in FIG. 7, with the four masses positioned as shown, allows simultaneously:

(a) To measure the angular-velocity vector in the plane perpendicular to the spinning axis,
(b) To measure the acceleration component in this same plane, and
(c) To measure and hence to regulate the spinning velocity.

Various other modifications of the invention may be conceived on the basis of the teachings set forth herein.

What I claim is:

1. In a system for indicating motion, in combination, a supporting structure rotatable at high velocity about an axis normal to a component of an acceleration to be indicated; a pair of masses carried by said structure and disposed on opposite sides of said axis; mounting means joining said masses to said structure with freedom of limited radial displacement towards and away from said axis; spring means restraining such displacement whereby said masses will undergo oscillatory movements in response to said acceleration about mean positions of equilibrium determined by the mutually opposing actions of said spring means and the centrifugal force induced by said velocity; electric circuit means including capacitive pick-off means associated with each mass and said structure for converting said oscillatory movement into fluctuating capacitances; first and second oscillator means connected to said pick-off means for respectively generating a first and a second oscillatory electric signals frequency-modulated in accordance with the fluctuations of said capacitances; and means connected with said circuit means for algebraically adding the amplitudes of said first and second signals to provide a variable output signal as a measure of said acceleration.

2. A combination as defined in claim 1 wherein said capacitive pick-off means includes a pair of capacitor elements respectively positioned adjacent and spaced from the radially outer surfaces of said respective masses to vary the capacitances present between the respective elements and the associated surfaces of said masses in opposite senses upon codirectional radial displacement of said masses in response to said acceleration.

3. A navigational instrument comprising a supporting structure rotatable at high speed about a spin axis; a first and a second pair of masses supported in crossed relationship on said structure for rotary entrainment thereby, the masses of each pair being disposed on opposite sides of said spin axis; means rigidly interconnecting the masses of the first pair and mounting same with freedom of limited displacement in directions generally parallel to said spin axis; means mounting the masses of the second pair with freedom of limited radial displacement toward and away from said spin axis; resilient means for restraining such radial displacement of said second pair of masses; first electrical pick-off means associated with said sturucture and each of the masses of said first pair for responding to oscillatory displacement of said first pair of masses in said parallel directions and converting same to a first electric oscillatory signal corresponding in frequency to said oscillatory displacement; second electrical pick-off means associated with said structure and each of the masses of said second pair for responding to oscillatory radial displacement of said second pair of masses and converting same to second and third electric oscillatory signals corresponding in frequency to the radial oscillatory displacement of said second pair of masses; means for indicating the amplitude of said first signal as a measure of rate of angular motion of the structure about an axis normal to said spin axis; and means for algebraically adding the amplitudes of said second and third signals and for indicating the resulting amplitude as a measure of acceleration of the structure in a direction having a component normal to said spin axis.

4. An insrtument as defined in claim 3 wherein said first electrical pick-off means comprises a pair of variable capacitors each having co-operating capacitive elements spaced in a direction parallel to said spin axis and respectively carried by said structure and by a corresponding mass of said first pair, said elements being so arranged that simultaneous displacement of said first pair of masses relative to the structure will vary the capacitances of said capacitors in the same sense.

5. An instrument as defined in claim 3 wherein said first pair of masses are interconnected by a rigid arm balanced substantially at its midpoint on a pivotal axis normal to said spin axis.

6. A navigational instrument comprising a supporting structure rotatable at high speed about a spin axis; a first and a second mass supported on said structure and offset from said spin axis; means mounting said first mass on said structure with freedom of limited displacement generally parallel to said axis; means mounting said second mass on said structure with freedom of limited displacement generally radial to said axis; resilient means for restraining such radial displacement of said second mass; first electrical pick-off means associated with said structure and said first mass for responding to oscillatory displacement of said first mass in response to Coriolis forces and for converting same into a first electric oscillatory signal; second electrical pick-off means associated with said structure and said second mass for responding to radial oscillatory displacements of said second mass in response to accelerations transverse to said spin axis and for converting same into a second electric oscillatory signal; and circuit means for indicating the amplitudes of said first and second electric signals as measures of rate of angular motion of the structure about an axis normal to said spin axis and of said transverse accelerations, respectively.

7. An instrument as defined in claim 6 wherein said first pick-off means includes a variable capacitor having co-operating elements spaced in a direction parallel to said spin axis and respectively carried by said structure and by said first mass; said second pick-off means including a variable capacitor having co-operating capacitor elements spaced in a direction perpendicular to said spin axis and respectively carried by said structure and by said second mass.

8. An instrument as defined in claim 6 wherein said circuit means includes oscillator means supported on said structure for rotary entrainment thereby and connected to said first and second pick-off means for producing said first and second electric signals, respectively.

9. In a system for indicating motion, in combination, a supporting structure rotatable at high speed about a spin axis, a mass carried by said structure for rotation therewith and having its center of gravity offset from said spin axis, mounting means joining said mass to said structure with freedom of oscillatory displacement relative to said structure in response to a parameter of the motion to be indicated, electric pick-off means associated with said mass and said structure for converting said oscillatory displacement into an oscillatory electric signal of corresponding frequency, oscillator means for generating an output signal of a given frequency, means for modulating said output signal with said oscillatory electric signal to provide a frequency-modulated resulting signal, means for producing a train of first pulses at a frequency corresponding to the frequency of said resulting signal, means for producing a train of second pulses at a frequency corresponding to the spin velocity of said structure, and pulse-counter means connected to receive both said first and second pulses and operative to count the number of said first pulses occurring per second pulse for producing an output signal proportional in magnitude to said count as a measure of the amplitude of said oscillatory electric signal.

10. The combination defined in claim 9 wherein said oscillator means is mounted on said structure for rotary entrainment thereby.

11. The combination defined in claim 9 wherein said pick-off means includes capacitive means with two co-operating elements forming part of said mass and said structure, respectively.

12. The combination defined in claim 9 wherein the means for producing said second pulses comprises photoelectric means for sensing the rotation of said structure and producing an output at a frequency corresponding to the velocity of said rotation, and pulse-generating means connected to the output of said photoelectric sensing means.

13. In a system for indicating motion, in combination, a supporting structure rotatable at high speed about a spin axis normal to an acceleration component to be indicated; a mass carried by said structure for rotation therewith and having its center of gravity offset from said axis; mounting means joining said mass to said structure with freedom of oscillatory displacement relative to said structure whereby said mass undergoes vibratory motion toward and away from said axis at a frequency corresponding to the speed of said rotation and with an amplitude and phase indicative of said acceleration; capacitive pick-off means carried by said structure for rotation therewith and associated with said mass for producing a fluctuating capacitance varying at a frequency and with an amplitude respectively corresponding to the frequency and amplitude of said vibratory motion; oscillator means carried by said structure for rotation therewith and generation of an alternating output signal at a predetermined high frequency; circuit means connecting said oscillator means to said pick-off means for frequency-modulating said output signal in dependence upon said fluctuating capacitance; and means connected to the output of said oscillator means for determining the modulation amplitude of said output signal as a measure of said acceleration.

14. In a system for indicating motion, in combination, a supporting structure rotatable at high speed about a spin axis; weight means carried by said structure for rotation therewith and offset from said axis; mounting means joining said weight means to said structure with freedom of oscillatory displacement relative to the structure so as to subject said weight means to vibratory motion at a frequency corresponding to the speed of said rotation and with an amplitude indicative of a parameter of the motion to be indicated; capacitive pick-off means associated with said weight means for producing a fluctuating capacitance varying at a frequency and with an amplitude respectively corresponding to the frequency and amplitude of said vibratory motion; oscillator means carried by said structure for rotation therewith and generation of an alternating output signal at a predetermined high frequency; circuit means connecting said oscillator means to said pick-off means for frequency-modulating said output signal in dependence upon said fluctuating capacitance; and signal-responsive means connected to the output of said oscillator means for determining the modulation amplitude of said output signal as a measure of said parameter of motion.

15. The combination defined in claim 14 wherein said weight means comprises two masses symmetrically disposed with respect to said spin axis.

16. The combination defined in claim 14 wherein said signal-responsive means comprises sensing means for determining the spin velocity of said structure and producing an alternating reference signal at a frequency corresponding to said velocity, and means connected to said sensing means and said oscillator means for combining said reference and output signals to produce a final signal as a measure of said parameter of motion.

17. The combination defined in claim 16 wherein said sensing means comprises photoelectric means.

References Cited by the Examiner

UNITED STATES PATENTS

| | | | |
|---|---|---|---|
| 1,801,619 | 4/1931 | Arrea | 74—5 X |
| 2,243,458 | 5/1941 | Esval et al. | 73—462 |
| 2,319,940 | 5/1943 | Marrison | 73—516 |
| 2,605,093 | 7/1952 | Dorand | 73—517 |
| 2,716,893 | 9/1955 | Birdsall | 73—504 |
| 2,726,074 | 12/1955 | Ketchledge | 73—516 |
| 2,928,667 | 3/1960 | Peterson | 73—505 |
| 2,991,659 | 7/1961 | Bowden | 74—5 |
| 3,014,374 | 12/1961 | Johnston | 73—517 |
| 3,083,578 | 4/1963 | Rosato | 73—504 |

FOREIGN PATENTS 791,827   3/1958   Great Britain.

RICHARD C. QUEISSER, Primary Examiner.

JOSEPH P. STRIZAK, Examiner.

J. J. GILL, Assistant Examiner.